(12) United States Patent
Peng et al.

(10) Patent No.: US 10,348,240 B2
(45) Date of Patent: Jul. 9, 2019

(54) FIBER-SHAPED ELECTRIC ENERGY HARVESTING AND STORAGE DEVICE AND METHOD OF MANUFACTURING THE SAME

(71) Applicants: Samsung Electronics Co., Ltd., Suwon-si, Gyeonggi-do (KR); Fudan University, Shanghai (CN)

(72) Inventors: Huisheng Peng, Shanghai (CN); Hao Sun, Shanghai (CN); Yishu Jiang, Shanghai (CN)

(73) Assignees: SAMSUNG ELECTRONICS CO., LTD., Gyeonggi-Do (KR); FUDAN UNIVERSITY, Shanghai (CN)

( * ) Notice: Subject to any disclaimer, the term of this patent is extended or adjusted under 35 U.S.C. 154(b) by 158 days.

(21) Appl. No.: 15/241,782

(22) Filed: Aug. 19, 2016

(65) Prior Publication Data

US 2017/0201210 A1     Jul. 13, 2017

(30) Foreign Application Priority Data

Jan. 8, 2016 (CN) .......................... 2016 1 0011765

(51) Int. Cl.
*H02S 40/38* (2014.01)
*H02S 30/20* (2014.01)
(Continued)

(52) U.S. Cl.
CPC ........... *H02S 40/38* (2014.12); *H01G 9/2004* (2013.01); *H01G 9/2086* (2013.01);
(Continued)

(58) Field of Classification Search
CPC ........... H01M 10/0525; H01M 10/058; H01M 10/465; H01M 2004/025; H02S 30/20; H02S 40/38; H01G 9/2086; H01G 9/2004; H01G 9/2022; H01G 9/2031; H01G 9/2059
See application file for complete search history.

(56) References Cited

U.S. PATENT DOCUMENTS 7,535,019 B1 * 5/2009 Sager ....................... D01D 5/34
136/252
7,622,667 B2 11/2009 Chittibabu et al.
(Continued)

FOREIGN PATENT DOCUMENTS

CN 201010504015 B 10/2010
CN 201110217865 B 8/2011
(Continued)

OTHER PUBLICATIONS

Pan et al., Miniature wire-shaped solar cells, electrochemical capacitors and lithium-ion batteries, vol. 17, Issue 6, Jul.-Aug. 2014, pp. 276-284.*
(Continued)

*Primary Examiner* — Golam Mowla
(74) *Attorney, Agent, or Firm* — Cantor Colburn LLP

(57) ABSTRACT

A fiber-shaped electric energy harvesting and storage device includes a substrate having a fiber shape, a lithium ion storage unit disposed to surround the substrate, and a plurality of photoelectric conversion units disposed to surround the lithium ion storage unit.

18 Claims, 14 Drawing Sheets

(51) Int. Cl.

| | | |
|---|---|---|
| H01G 9/20 | (2006.01) | |
| H01M 10/0525 | (2010.01) | |
| H01M 10/058 | (2010.01) | |
| H01M 10/46 | (2006.01) | |
| H02S 20/00 | (2014.01) | |
| H01M 4/02 | (2006.01) | |

(52) U.S. Cl.
CPC ..... *H01M 10/058* (2013.01); *H01M 10/0525* (2013.01); *H01M 10/465* (2013.01); *H02S 20/00* (2013.01); *H02S 30/20* (2014.12); *H01G 9/2022* (2013.01); *H01G 9/2031* (2013.01); *H01G 9/2059* (2013.01); *H01M 2004/025* (2013.01); *Y02E 10/542* (2013.01); *Y02E 60/122* (2013.01); *Y02P 70/54* (2015.11)

(56) References Cited

U.S. PATENT DOCUMENTS

| | | | | |
|---|---|---|---|---|
| 7,635,905 | B2 * | 12/2009 | Kim, II | H01L 31/03528 257/432 |
| 8,247,688 | B2 | 8/2012 | Curran | |
| 8,463,092 | B2 * | 6/2013 | Farahi | B32B 5/022 136/243 |
| 8,542,478 | B2 * | 9/2013 | Momo | H01G 11/08 136/244 |
| 2009/0176159 | A1 * | 7/2009 | Zhamu | H01M 4/483 429/222 |
| 2009/0186276 | A1 * | 7/2009 | Zhamu | H01M 4/045 429/221 |
| 2010/0216023 | A1 * | 8/2010 | Wei | H01G 9/058 429/220 |
| 2010/0258160 | A1 * | 10/2010 | Wang | H01G 9/2086 136/246 |
| 2010/0307559 | A1 * | 12/2010 | Yamazaki | H01L 31/048 136/244 |
| 2016/0111564 | A1 * | 4/2016 | Gidwani | H01M 8/04067 429/434 |
| 2016/0254407 | A1 * | 9/2016 | Wang | H01L 31/03528 136/256 |

FOREIGN PATENT DOCUMENTS

| | | |
|---|---|---|
| CN | 201110408012 A | 12/2011 |
| CN | 201110409883 B | 12/2011 |
| CN | 201210219932 A | 6/2012 |
| CN | 201310151572 B | 4/2013 |
| CN | 201310279470 A | 7/2013 |
| CN | 201310280290 B | 7/2013 |
| CN | 103400889 A | 11/2013 |
| CN | 103578798 A | 2/2014 |
| CN | 201410082805 A | 3/2014 |
| CN | 201410084389 A | 3/2014 |
| CN | 201410256186 B | 6/2014 |
| CN | 103904366 A | 7/2014 |
| CN | 201410448642 B | 9/2014 |
| CN | 201410451373 A | 9/2014 |
| CN | 201410548742 B | 10/2014 |
| CN | 201410555186 B | 10/2014 |
| CN | 201410374822 A | 1/2015 |
| CN | 102930996 B | 12/2015 |
| JP | 2001135364 A | 5/2001 |
| JP | 3133940 U | 8/2007 |

OTHER PUBLICATIONS

Dingshan Yu et al., Controlled Functionalization of Carbonaceous Fibers for Asymmetric Solid-State Micro-Supercapacitors with High Volumetric Energy Density, Article, 2014, pp. 6790-6797, 26, Wiley-VCH Verlag GmbH & Co. KGaA, Weinheim.

Dingshan Yu et al., Transforming Pristine Carbon Fiber Tows into High Performance Solid-State Fiber Supercapacitors, Article, 2015, pp. 4895-4901, 27, Wiley-VCH Verlag GmbH & Co. KGaA, Weinheim.

Qinhai Meng et al., High-Performance All-Carbon Yarn Micro-Supercapacitor for an Integrated Energy System, Article, 2014, pp. 4100-4106, 26, Wiley-VCH Verlag GmbH & Co. KGaA, Weinheim.

Kai Wang et al., High-Performance Two-Ply Yarn Supercapacitors Based on Carbon Nanotubes and Polyaniline Nanowire Arrays, Article, 2013, pp. 1494-1498, 25, Wiley-VCH Verlag GmbH & Co. KGaA, Weinheim.

Junwen Zhong et al., Stretchable Self-Powered Fiber-Based Strain Sensor, Article, 2015, pp. 1798-1803, 25, Wiley-VCH Verlag GmbH & Co. KGaA, Weinheim.

Zhibin Yang et al., Photovoltaic Wire Derived from a Graphene Composite Fiber Achieving an 8.45% Energy Conversion Efficiency, Article, 2013, pp. 7693-7696, 125, Wiley-VCH Verlag GmbH & Co. KGaA, Weinheim.

Huisheng Peng, Angewandte Chemie, 2014, p. 918, 53, Wiley-VCH Verlag GmbH & Co. KGaA, Weinheim.

Hao Sun et al., Self-Healable Electrically Conducting Wires for Wearable Microelectronics, Article, 2014, pp. 526-9531, 53, Wiley-VCH Verlag GmbH & Co. KGaA, Weinheim.

Zhenbo Cai et al., Flexible, weavable and efficient microsupercapacitor wires based on polyaniline composite fibers incorporated with aligned carbon nanotubes, Article, 2013, pp. 258-261, 1, Journal of Materials Chemistry, The Royal Society of Chemistry.

Ye Zhang et al., High-Performance Lithium-Air Battery with a Coaxial-Fiber Architecture, Article, 2016, pp. 1563-4567, 128, Wiley-VCH Verlag GmbH & Co. KGaA, Weinheim.

Wei Weng et al., Winding Aligned Carbon Nanotube Composite Yarns into Coaxial Fiber Full Batteries with High Performances, Article, 2014, pp. 3432-3438, 14, Nano Letter, ACS publications, American Chemical Society.

Tao Chen et al., An Integrated "Energy Wire" for both Photoelectric Conversion and Energy Storage, Article, 2012, pp. 11977-11980, 51, Wiley-VCH Verlag GmbH & Co. KGaA, Weinheim.

Yongping Fu et al., Integrated power fiber for energy conversion and storage, Journal, 2013, pp. 805-812, 6, Energy Environ., The Royal Society of Chemistry.

Xuli Chen et al., A novel "energy fiber" by coaxially integrating dyesensitized solar cell and electrochemical capacitor, Journal, 2014, pp. 1897-1902, 2, J. Mater. Chem. A., The Royal Society of Chemistry.

Zhitao Zhang et al., Integrated Polymer Solar Cell and Electrochemical Supercapacitor in a Flexible and Stable Fiber Format, Article, 2014, pp. 466-470, 26, Wiley-VCH Verlag GmbH & Co. KGaA, Weinheim.

Hao Sun et al., Novel Graphene/Carbon Nanotube Composite Fibers for Efficient Wire-Shaped Miniature Energy Devices, Article, 2014, pp. 2868-2873, 26, Wiley-VCH Verlag GmbH & Co. KGaA, Weinheim.

Zhibin Yang et al., Stretchable, Wearable Dye-Sensitized Solar Cells, Article, 2014, pp. 2643-2647, 26, Wiley-VCH Verlag GmbH & Co. KGaA, Weinheim.

Hao Sun et al., Energy harvesting and storage devices fused into various patterns, Article, 2015, pp. 14977-14984, 3, J. Mater. Chem. A., The Royal Society of Chemistry.

* cited by examiner

FIBER-SHAPED ELECTRIC ENERGY HARVESTING AND STORAGE DEVICE AND METHOD OF MANUFACTURING THE SAME

CROSS-REFERENCE TO RELATED PATENT APPLICATION

This application claims priority to Chinese Patent Application No. 201610011765.4, filed on Jan. 8, 2016, and all the benefits accruing therefrom under 35 U.S.C. § 119, the content of which in its entirety is herein incorporated by reference.

BACKGROUND

1. Field

The disclosure relates to a fiber-shaped electric energy harvesting and storage device and a method of manufacturing the fiber-shaped electric energy harvesting and storage device.

2. Description of the Related Art

Fiber-shaped electric energy harvesting and storage devices are typically light, flexible and wearable, compared with electric energy harvesting and storage devices having flat structures or bulky structures, and thus are gaining much attention. In recent years, research into fiber-shaped solar cells, super-capacitors, and lithium ion batteries have been intensively conducted. Generally, fiber-shaped electric energy harvesting devices are manufactured by winding two fiber electrodes coated with an active material with each other.

SUMMARY

To reduce the size of a fiber-shaped electric energy harvesting device and to improve the performance thereof, a photoelectric conversion device and an electrochemical storage device are desired to be integrated into a single fiber-shaped device.

Embodiments of the invention are directed to a fiber-shaped electric energy harvesting and storage device and a method of manufacturing the fiber-shaped electric energy harvesting and storage device.

According to an embodiment of the invention, an electric energy harvesting and storage device includes a substrate having a fiber shape; a lithium ion storage unit disposed to surround the substrate; and a plurality of photoelectric conversion units disposed to surround the lithium ion storage unit.

In an embodiment, the photoelectric conversion units may be spaced apart from one another in a length direction of the substrate and may be serially connected to one another.

In an embodiment, the lithium ion storage unit may include a cathode having a fiber shape and disposed around the substrate, an anode having a fiber shape and disposed around the substrate, a first cylindrical tube disposed to be spaced apart from the substrate and surround the substrate, and a first electrolyte disposed to fill a space between the substrate and the first cylindrical tube.

In an embodiment, the cathode and the anode may wind the substrate, and each of the cathode and the anode may include aligned multi-wall carbon nanotubes ("MWCNT"s) and active material nanoparticles attached to the MWCNTs.

In an embodiment, each of the photoelectric conversion units may include a counter electrode disposed on the first cylindrical tube, a photoanode disposed on the counter electrode, a second cylindrical tube disposed to be spaced apart from the first cylindrical tube and surround the first cylindrical tube, and a second electrolyte disposed to fill a space between the first cylindrical tube and the second cylindrical tube.

In an embodiment, the counter electrode may include aligned MWCNTs disposed to surround the first cylindrical tube.

In an embodiment, the photoanode may wind the counter electrode in a spiral shape.

In an embodiment, the photoanode may include titanium (Ti) wire disposed on the counter electrode, and Ti dioxide nanotubes vertically aligned on a surface of the Ti wire.

In an embodiment, the photoanode of a photoelectric conversion unit of the photoelectric conversion units may be electrically connected to a counter electrode of an adjacent photoelectric conversion unit thereof.

In an embodiment, the photoanode of the photoelectric conversion unit may be electrically connected to the anode of the lithium ion storage unit, and the counter electrode of the photoelectric conversion unit may be electrically connected to the cathode of the lithium ion storage unit.

According to another embodiment of the invention, a method of manufacturing an electric energy harvesting and storage device includes preparing for a substrate having a fiber shape; providing a lithium ion storage unit to surround the substrate; and providing a plurality of photoelectric conversion units to surround the lithium ion storage unit.

In an embodiment, the photoelectric conversion units may be spaced apart from one another in a length direction of the substrate and may be serially connected to one another.

In an embodiment, the providing the lithium ion storage unit may include providing a cathode having a fiber shape and an anode having a fiber shape on the substrate; providing a first cylindrical tube to be spaced apart from the substrate and to surround the substrate; and providing a first electrolyte between the substrate and the first cylindrical tube.

In an embodiment, each of the cathode and the anode may include aligned MWCNTs and active material nanoparticles attached to the aligned MWCNTs.

In an embodiment, the providing the photoelectric conversion units may include providing a counter electrode on the first cylindrical tube; providing a photoanode on the counter electrode; providing a second cylindrical tube to be spaced apart from the first cylindrical tube and to surround the first cylindrical tube; and providing a second electrolyte between the first cylindrical tube and the second cylindrical tube.

In an embodiment, the photoanode may wind the counter electrode in a spiral shape.

In an embodiment, the photoanode of each of the photoelectric conversion units may be electrically connected to a counter electrode of an adjacent photoelectric conversion unit thereof.

BRIEF DESCRIPTION OF THE DRAWINGS

These and/or other features of embodiments of the invention will become apparent and more readily appreciated from the following description of the embodiments, taken in conjunction with the accompanying drawings, in which.

DETAILED DESCRIPTION

Figure 1:
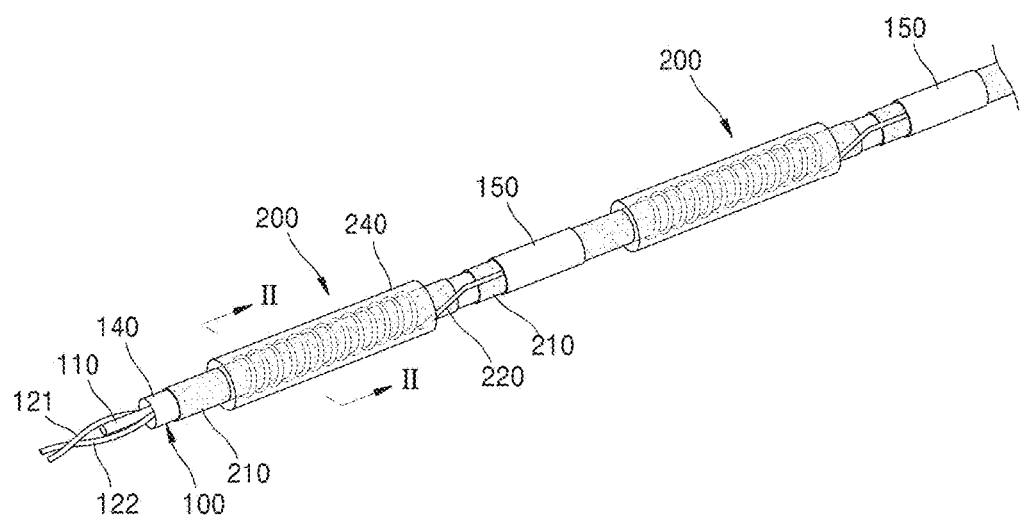
FIG. 1 is a perspective view of an electric energy harvesting and storage device according to an exemplary embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
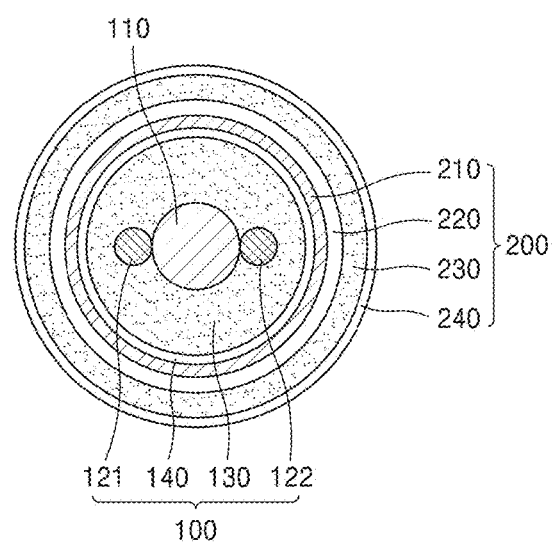
FIG. 2 is a cross-sectional view taken along line II-II in FIG. 1.

FIG. 1 is a perspective view of an electric energy harvesting and storage device according to an exemplary embodiment. FIG. 2 is a cross-sectional view taken along line II-II in FIG. 1.

Referring to FIGS. 1 and 2, the electric energy harvesting and storage device includes a fiber-shaped substrate or a substrate having a fiber shape 110, a lithium ion storage unit 100 surrounding the substrate 110, and a plurality of photoelectric conversion units 200 surrounding the lithium ion storage unit 100.

The fiber-shaped substrate 110 may include a flexible material. In one exemplary embodiment, for example, the fiber-shaped substrate 110 includes a rubber fiber. However, this is only exemplary, and fibers formed of various other materials may be used as the fiber-shape substrate.

The lithium ion storage unit 100 is disposed or provided on the fiber-shaped substrate 110. The lithium ion storage unit 100 may surround the substrate 110. The lithium ion storage unit 100 may be, for example, a lithium ion battery.

The lithium ion storage unit 100 may include a cathode 121 disposed on the substrate 110, an anode 122 disposed on the substrate 110, a first cylindrical tube 140 separated or spaced apart from the substrate 110 and surrounding the substrate 110, and a first electrolyte 130 disposed in, e.g., filling, a space between the substrate 110 and the first cylindrical tube 140.

Figure 3:
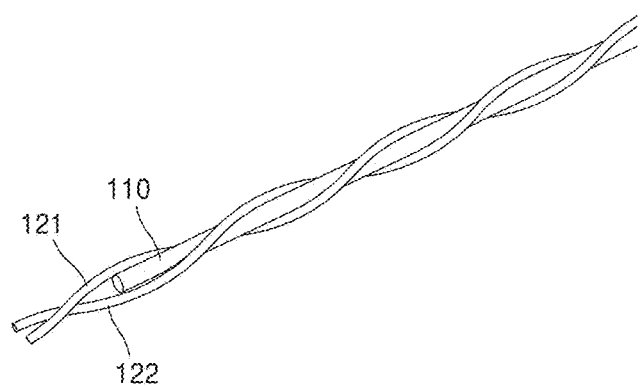
FIG. 3 illustrates a cathode and an anode on a fiber-shaped substrate in the electric energy harvesting and storage device of FIG. 1.

FIG. 3 illustrates the cathode 121 and the anode 122 disposed on the fiber-shaped substrate 110 in the electric energy harvesting and storage device of FIG. 1. Referring to FIG. 3, in an exemplary embodiment, each of the cathode 121 and the anode 122 has a fiber shape, and both of the cathode 121 and the anode 122 may surround the substrate 110.

The cathode 121 may serve as a positive electrode of the lithium ion storage unit 100. The fiber-shaped cathode 121 may include aligned multi-wall carbon nanotubes ("MWCNT"s) and active material nanoparticles attached to the MWCNTs. The active material nanoparticles used in the cathode 121 may include, for example, $LiMn_2O_4$ ("LMO") nanoparticles.

The active material nanoparticles in the cathode 121 may include various other materials. In one exemplary embodiment, for example, the active material nanoparticles used in the cathode 121 may include at least one selected from lithium transition metal oxide, such as lithium cobalt oxide, lithium nickel oxide, lithium nickel-cobalt oxide, lithium nickel-co-aluminum oxide, lithium nickel-co-manganese oxide, lithium manganese oxide, and lithium iron phosphate, nickel sulfide, copper sulfide, sulfur, iron oxide, and vanadium oxide.

The anode 122 may serve as a negative electrode of the lithium ion storage unit 100. The anode 122 having a fiber shape may include aligned MWCNTs and active material nanoparticles attached to the MWCNTs. The active material nanoparticles in the anode 122 may include, for example, $Li_2Ti_5O_{12}$ ("LTO").

In an alternative exemplary embodiment, the active material nanoparticles in the anode 122 may include various other materials. In one exemplary embodiment, for example, the active material nanoparticles in the anode 122 may include at least one material selected from a metal, a carbon-based material, a metal oxide, and lithium metal nitride. In an exemplary embodiment, where the active material nanoparticles in the anode 122 includes a metal, the metal may include at least one material selected from lithium, silicon, magnesium, calcium, aluminum, germanium, tin, lead, arsenic, antimony, bismuth, silver, gold, zinc, cadmium, mercury, copper, iron, nickel, cobalt, and indium. The carbon-based material may include at least one material selected from graphite, graphite carbon fiber, cokes, meso carbon microbeads ("MCMB"), polyacene quinone, pitch-based carbon fiber, and hard carbon. In an exemplary embodiment, where the active material nanoparticles in the anode 122 includes a metal oxide, the metal oxide may include at least one material selected from lithium titanium oxide, titanium oxide, molybdenum oxide, niobium oxide, iron oxide, tungsten oxide, tin oxide, an amorphous tin oxide compound, silicon monoxide, cobalt oxide, and nickel oxide. However, embodiments of the invention are not limited to those described herein.

The first cylindrical tube 140 surrounds the fiber-shaped substrate 110 on which the cathode 121 and the anode 122 are spirally disposed. The first cylindrical tube 140 may be a heat-shrinkable tube, but embodiments are not limited thereto. A space between the substrate 110 and the first cylindrical tube 140 is filled with the first electrolyte 130, which may electrolyte typically used in lithium ion batteries.

The plurality of photoelectric conversion units 200 is disposed on the exterior (e.g., on an outer surface) of the lithium ion storage unit 100. The photoelectric conversion units 200 surround the lithium ion storage unit 100. The photoelectric conversion units 200 are spaced apart from one another in a length direction of the substrate 110. The photoelectric conversion units 200 may be electrically connected to one another in series.

Each of the photoelectric conversion units 200 may be a solar cell that absorbs light from the sun and generates electric energy. In one exemplary embodiment, for example, the photoelectric conversion unit 200 may be a dye-sensitized solar cell ("DSSC"). The photoelectric conversion unit 200 includes a counter electrode 210 disposed on the first cylindrical tube 140, a photoanode 220 disposed on the counter electrode 210, a second cylindrical tube 240 spaced apart from the first cylindrical tube 140, and a second electrolyte 230 disposed in or filling a space between the first cylindrical tube 140 and the second cylindrical tube 240.

The counter electrode 210 may cover an external surface of the first cylindrical tube 140. The counter electrode 210 may include, for example, aligned MWCNTs. However, this is merely exemplary, and various other materials may be used to form the counter electrode 210.

Figure 4:
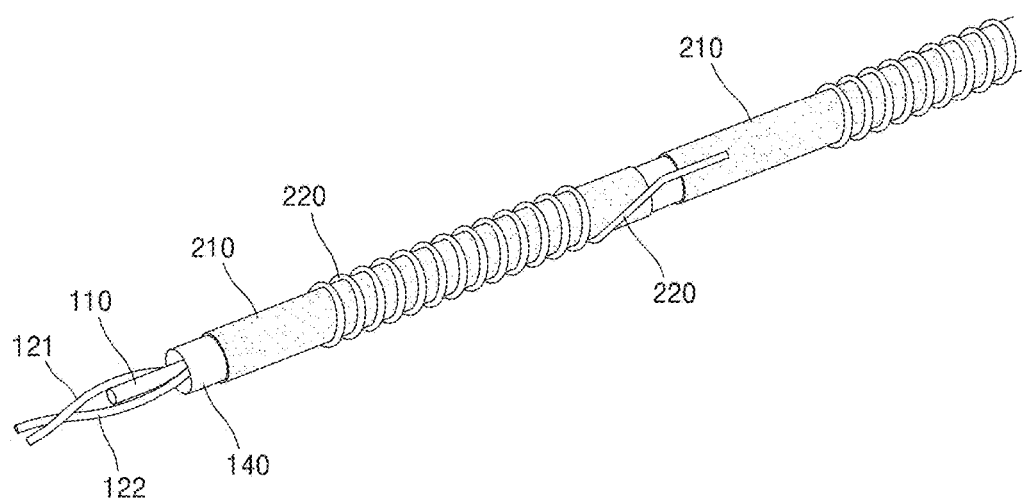
FIG. 4 illustrates a photoanode on a counter electrode in the electric energy harvesting and storage device of FIG. 1.

The photoanode 220 is disposed on the counter electrode 210. FIG. 4 illustrates the photoanode 220 disposed on the counter electrode 210. Referring to FIG. 4, the photoanode 220 may wind the counter electrode 210 in a coil-like shape or a spiral shape. The photoanode 220 may include, for example, a titanium (Ti) wire that winds the counter electrode 210, and titanium dioxide nanotubes may be vertically aligned on the surface of the Ti wire. However, this is merely exemplary, and various other materials may be used to form the photoanode 220.

The second cylindrical tube 240 may be spaced apart from the first cylindrical tube 140 and surround the first cylindrical tube 140. The second cylindrical tube 240 may be a transparent heat-shrinkable tube, but embodiments are not limited thereto. The space between the first cylindrical tube 140 and the second cylindrical tube 240 may be filled with the second electrolyte 230, which may be an electrolyte typically used in DSSCs.

In such an embodiment, as described above, the photoelectric conversion units 200 disposed on the lithium ion storage unit 100 may be serially connected to one another to generate a larger amount of electric energy. In such an embodiment, the photoanode 220 of a photoelectric conversion unit 200 may be electrically connected to the counter electrode 210 of another photoelectric conversion unit 200 adjacent thereto. The electrical connection may be reinforced by using a conductive connection member 150, such as, a silver paste, as a connecting portion between the photoanode 220 and the counter electrode 210.

A switching device (not shown) capable of turning on or off an electrical connection may be disposed or connected between the lithium ion storage unit 100 and the photoelectric conversion units 200. Electric energy obtained by the photoelectric conversion units 200 may be charged in the lithium ion storage unit 100. During such a charging of the lithium ion storage unit 100, the lithium ion storage unit 100 may be electrically connected to the photoelectric conversion units 200. In an exemplary embodiment, the photoanode 220 of the photoelectric conversion unit 200 may be electrically connected to the anode 122 of the lithium ion storage unit 100, and the counter electrode 210 of the photoelectric conversion unit 200 may be electrically connected to the cathode 121 of the lithium ion storage unit 100.

In such an embodiment, the lithium ion storage unit 100 and the plurality of serially-connected photoelectric conversion units 200 are integrated onto the fiber-shaped substrate 110 in a core-sheath structure, thereby defining an electric energy harvesting and storage device capable of achieving high photoelectric conversion efficiency and high energy storage capability. The electric energy harvesting and storage device is embodied in flexible fibers and is thus usefully applicable to various electronic apparatuses such as wearable devices.

A method of manufacturing the above-described electric energy harvesting and storage device will now be described in detail. FIGS. 5A to 5F are perspective views showing a method of manufacturing the electric energy harvesting and storage device according to an exemplary embodiment shown in FIG. 1.

Figure 5A:
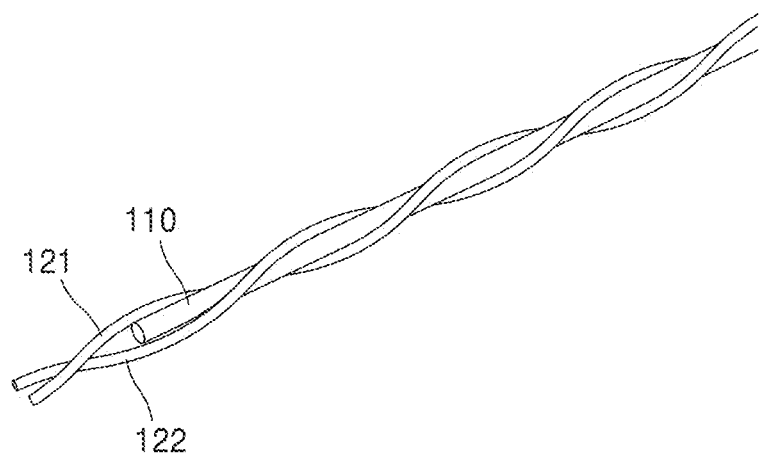
FIGS. 5A to 5F are perspective views for explaining a method of manufacturing the electric energy harvesting and storage device according to the exemplary embodiment of FIG. 1.

Referring to FIG. 5A, the fiber-shaped substrate 110 is prepared for. The fiber-shaped substrate 110 may include a flexible material. In one exemplary embodiment, for example, the fiber-shaped substrate 110 includes a rubber fiber having a diameter of about 500 micrometers (μm). However, embodiments of the invention are not limited thereto.

A cathode 121 having a fiber shape and the anode 122 having a fiber shape are prepared. The cathode 121 and the anode 122 may serve as a positive electrode and a negative electrode, respectively, of the lithium ion storage unit 100. The fiber-shaped cathode 121 may include aligned MWCNTs and active material nanoparticles attached to the aligned MWCNTs. The active material nanoparticles in the cathode 121 may include, for example, LMO. The fiber-shaped cathode 121 including the MWCNTs and the LMO nanoparticles may be manufacturing using the method below.

First, the LMO nanoparticles are synthesized using a solid-state method. A suspension is formed by dispersing the synthesized LMO nanoparticles of 150 milligrams (mg) and MWCNT powder of 15 mg into N,N-dimethylformamide of 30 milliliters (ml). The MWCNT used herein may have a length of about 10 μm to about 20 μm and a diameter of 10 nanometers (nm) to about 20 nm. Next, two stacked aligned MWCNT sheets are dipped within the suspension so that the LMO nanoparticles are attached to the aligned MWCNT sheets. The aligned MWCNT sheets used herein may each have a width of about 2 centimeters (cm). The aligned MWCNT sheets having the LMO nanoparticles attached thereto are scrolled to form a fiber.

The fiber-shaped anode 122 may include aligned MWCNTs and active material nanoparticles attached to the aligned MWCNTs. The active material nanoparticles in the anode 122 may include, for example, LTO. The fiber-shaped anode 122 including the MWCNTs and the LTO nanoparticles may be manufacturing using the method below.

After the LTO nanoparticles are synthesized using a hydrothermal method, the synthesized LTO nanoparticles of 150 mg are dispersed into 30 ml of N,N-dimethylformamide to thereby form a suspension. Next, two stacked aligned MWCNT sheets are dipped within the suspension so that the LTO nanoparticles are attached to the aligned MWCNT sheets. The aligned MWCNT sheets used herein may each have a width of about 2 cm. After the aligned MWCNT sheets having the LTO nanoparticles attached thereto are scrolled to form a fiber, the fiber is dipped into an aqueous graphene oxide solution of about 0.5 weight percent (wt %) and is thus coated with a graphene oxide thin film layer. The graphene oxide thin film layer may improve the structural stability of an electrode.

The fiber-shaped cathode 121 and the fiber-shaped anode 122 manufactured as described above may be coated with a gel electrolyte, and then may be spirally wound around the fiber-shaped substrate 110, e.g., a rubber fiber having a diameter of about 500 μm.

Figure 5B:
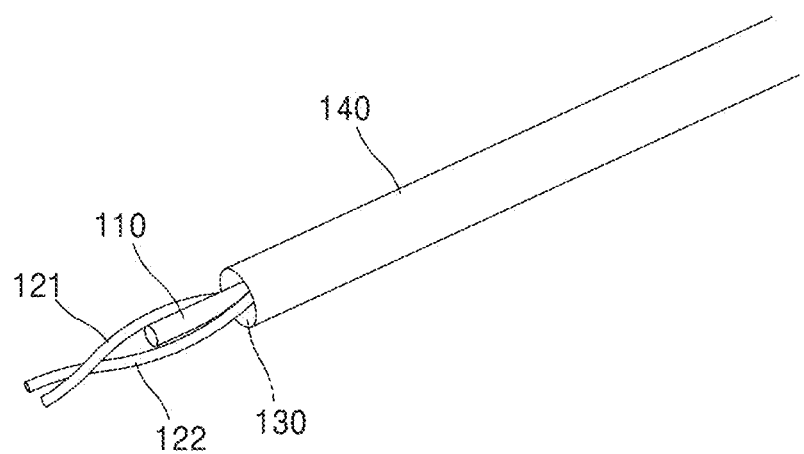

Referring to FIG. 5B, the cathode 121 and the anode 122 wound around the fiber-shaped substrate 110 are inserted into the first cylindrical tube 140, a gel electrolyte is injected into the first cylindrical tube 140, and both ends of the first cylindrical tube 140 are sealed, thereby manufacturing the lithium ion storage unit 100. In one exemplary embodiment, for example, a heat-shrinkable tube having a diameter of, for example, about 1.5 millimeters (mm) may be used as the first cylindrical tube 140.

Figure 5C:
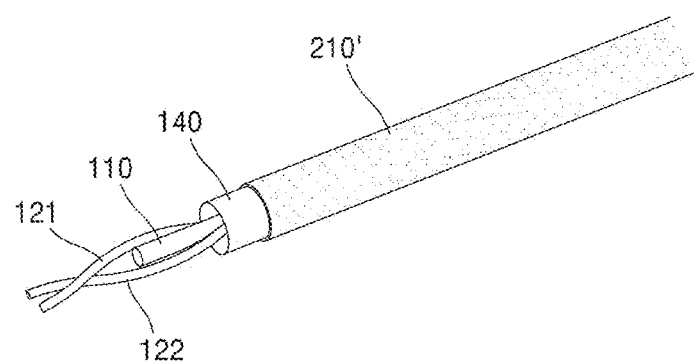
Figure 5D:
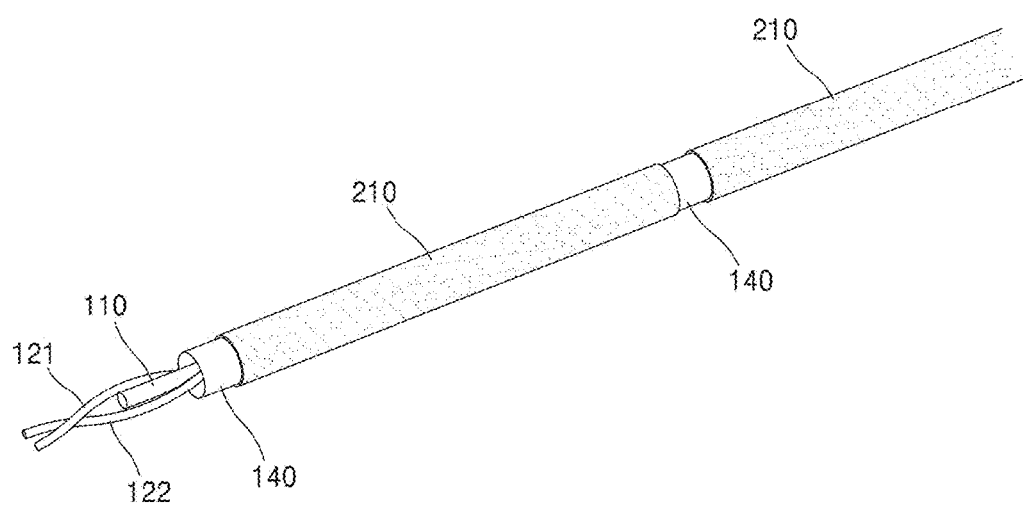

Referring to FIG. 5C, after the first cylindrical tube 140 is surrounded by an aligned MWCNT sheet 210', the aligned MWCNT sheet 210' is split into a plurality of aligned MWCNTs by using, for example, a mask. Thus, as shown in FIG. 5D, a plurality of counter electrodes 210 is provided or formed.

Figure 5E:
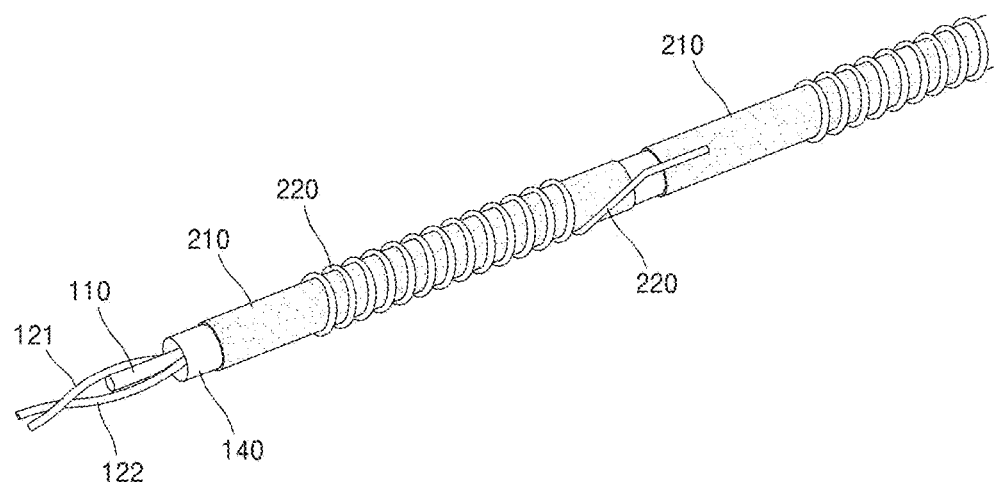

Referring to FIG. 5E, the photoanode 220 winds each of the aligned MWCNTs, which are the counter electrodes 210. The photoanode 220 may be manufactured using the method below.

First, a Ti wire having a diameter of 127 μm winds aligned MWCNTs, which are a counter electrode 210, in a spiral shape, and then a cleaning process is performed using acetone, isopropanol, and water. Then, Ti dioxide nanotubes aligned on a surface of the Ti wire are vertically grown using an anodic oxidation method. The spiral Ti wire is heat-treated at 500° C. for 60 minutes, processed within a $TiCl_4$ aqueous solution of 40 milliMolar (mM), and then heat-treated again at 450° C. for 30 minutes. The Ti wire processed as described above is dipped into an N719 solution (0.3 mM, mixture solvent of equal volume of dehydrated acetonitrile and tert-butanol) for 16 hours. A photoanode 220 provided on a counter electrode 210 is electrically connected to another adjacent counter electrode 210. In an exemplary embodiment, one end of a Ti wire provided to wind aligned MWCNTs contacts aligned MWCNTs adjacent to the former aligned MWCNTs.

Figure 5F:
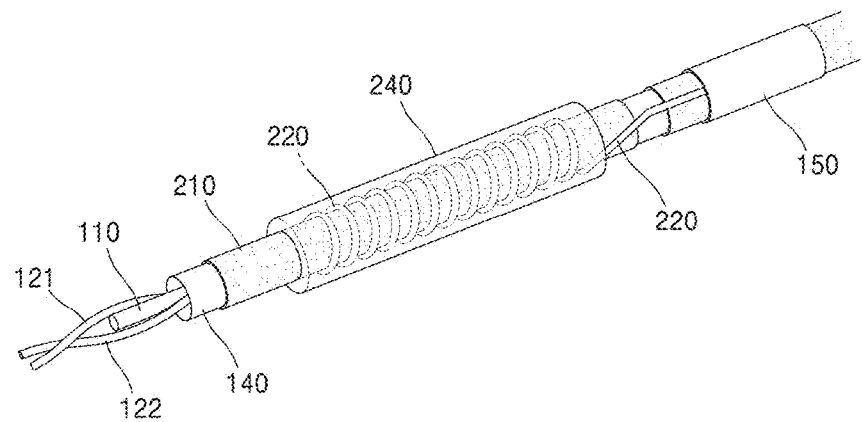

Referring to FIG. 5F, the counter electrode 210, on which the photoanode 220 is spirally wound, are inserted into the second cylindrical tube 240, a gel electrolyte is injected into the second cylindrical tube 240, and both ends of the second cylindrical tube 240 are sealed, thereby manufacturing the photoelectric conversion unit 200. A transparent heat-shrinkable tube may be used as the second cylindrical tube 240. Thus, photoelectric conversion units 200 may be provided on the exterior of the lithium ion storage unit 100 and may be spaced apart from one another in a length direction of the substrate 110. One end of a Ti wire provided to wind aligned MWCNTs contacts aligned MWCNTs adjacent to the former aligned MWCNTs, and thus the photoelectric conversion units 200 are serially connected to one another. To improve the connection among the photoelectric conversion units 200, the conductive connection member 150, such as a silver paste, may be further provided on a connection portion between a Ti wire and aligned MWCNTs adjacent to the Ti wire.

The above-manufactured photoelectric conversion units 200 may be electrically connected to the above-manufactured lithium ion storage unit 100. In such an embodiment, a photoanode 220 and a counter electrode 210 of each of the photoelectric conversion units 200 may be connected to an anode 122 and a cathode 121 of the lithium ion storage unit 100, respectively. A switching device (not shown) capable of turning on or off an electrical connection may be provided between the lithium ion storage unit 100 and the photoelectric conversion units 200.

FIGS. 6A to 6I are scanning electron microscopy ("SEM") images showing a structure of an electric energy harvesting and storage device according to an exemplary embodiment.

Figure 6A:
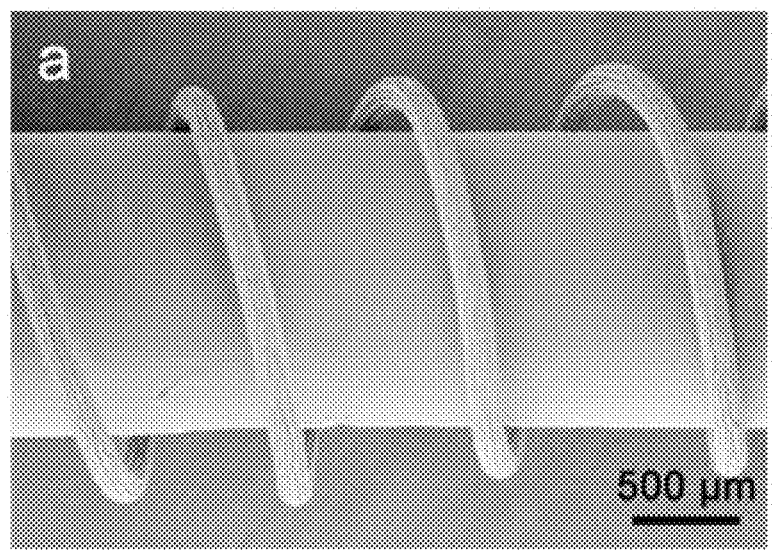
FIG. 6A is a scanning electron microscopy ("SEM") image showing that a titanium (Ti) wire winds aligned multi-wall carbon nanotubes ("MWCNT"s) in a spiral shape.
Figure 6B:
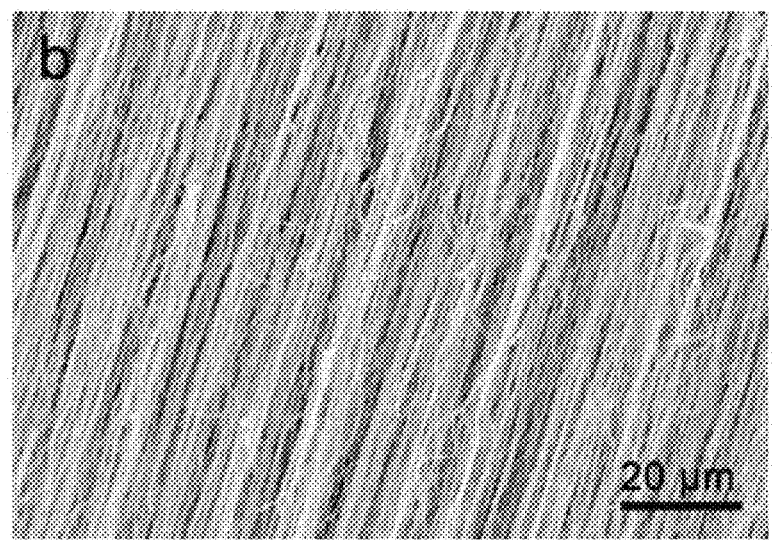
FIG. 6B is an SEM image showing an aligned MWCNT sheet.
Figure 6C:
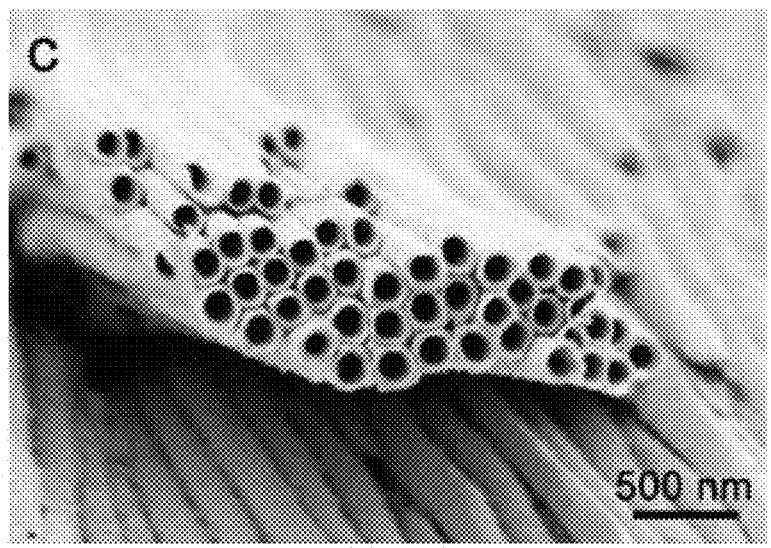
FIG. 6C is an SEM image showing Ti dioxide nanotubes.

In detail, FIG. 6A is an SEM image showing that a Ti wire, which is a photoanode, winds aligned MWCNTs, which are a counter electrode, in a spiral shape. A screw pitch of the Ti wire is about 1 mm. FIG. 6B is an SEM image showing an aligned MWCNT sheet which is a counter electrode. The aligned MWCNT sheet may have a rapid charge transport feature. FIG. 6C is an SEM image showing Ti dioxide nanotubes vertically aligned on a surface of the Ti wire which is a photoanode. The Ti dioxide nanotubes may be formed by being vertically grown on the surface of the Ti wire by using an anodic oxidation method.

Figure 6D:
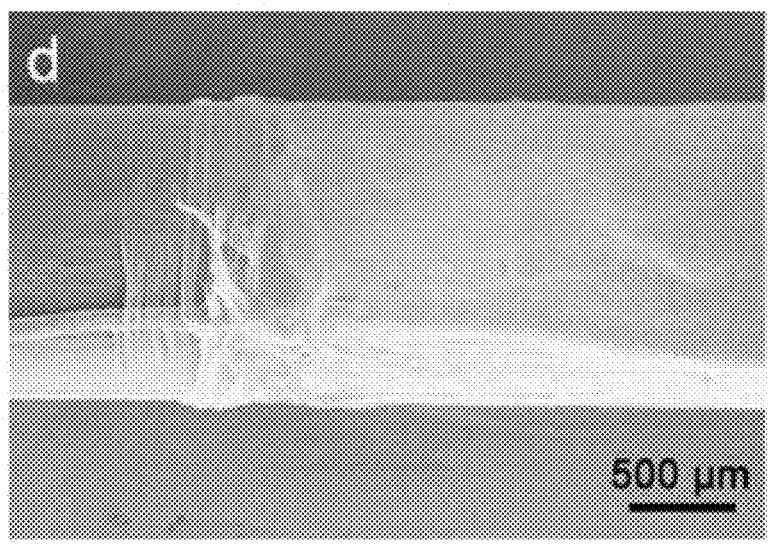
FIG. 6D is an SEM image showing a connection portion between the Ti wire and the aligned MWCNTs.
Figure 6E:
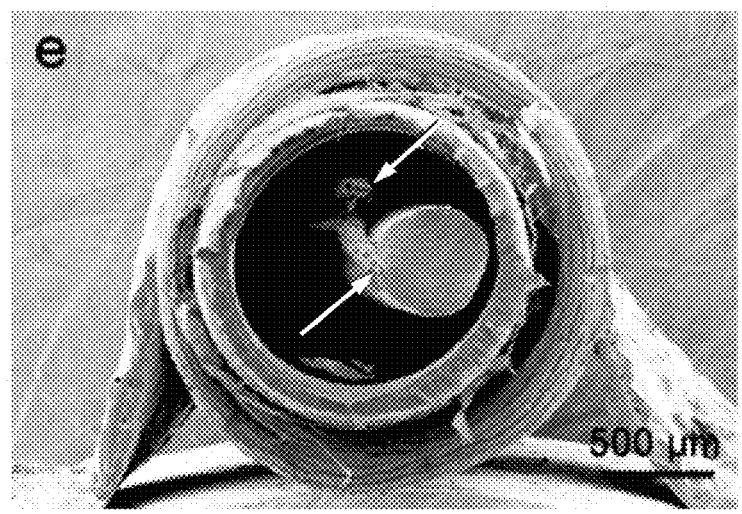
FIG. 6E is an SEM image showing a cross-section of an electric energy harvesting and storage device including a fiber-shaped cathode and a fiber-shaped anode.

FIG. 6D is an SEM image showing a connection portion between the Ti wire and aligned MWCNTs. Referring to FIG. 6D, a connection portion between one end of the Ti wire, which is a photoanode, and the aligned MWCNTs are wound by a silver paste. The silver paste reduces contact resistance between the Ti wire and the aligned MWCNTs and thus improves an electrical connection therebetween. FIG. 6E is an SEM image showing a cross-section of an electric energy harvesting and storage device including a fiber-shaped cathode and a fiber-shaped anode (indicated by arrows).

Figure 6F:
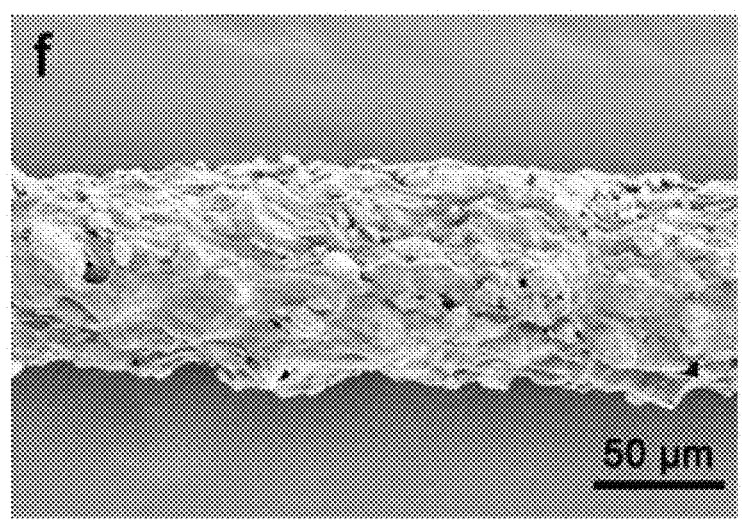
FIGS. 6F and 6G are an SEM image of aligned MWCNTs including $LiMn_2O_4$ ("LMO") nanoparticles attached thereto, and a magnified view of the aligned MWCNTs, respectively.
Figure 6G:
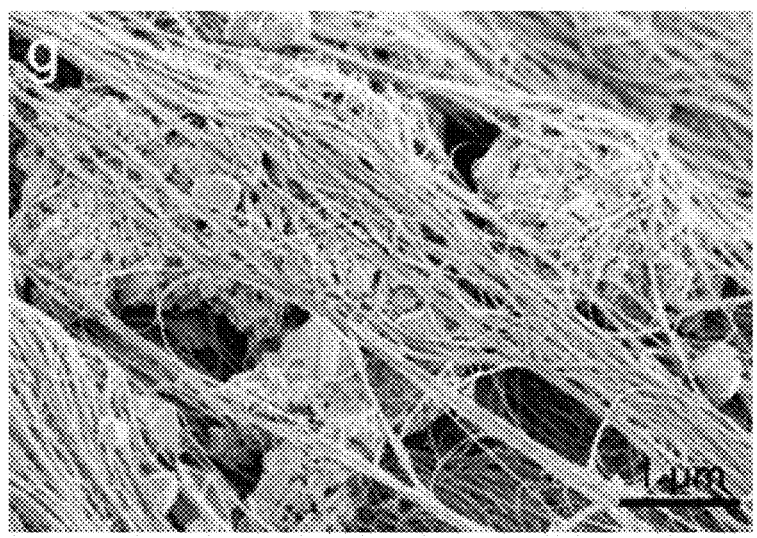
Figure 6H:
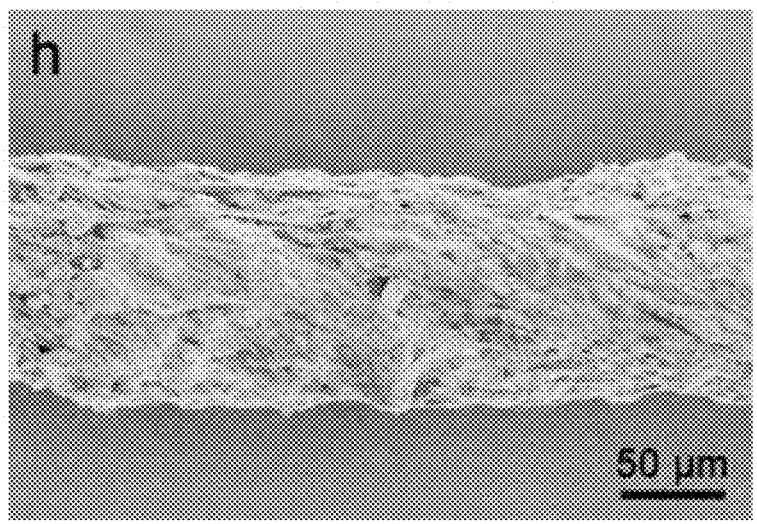
FIGS. 6H and 6I are an SEM image of aligned MWCNTs including $Li_2Ti_5O_{12}$ ("LTO") nanoparticles attached thereto, and a magnified view of the aligned MWCNTs, respectively.
Figure 6I:
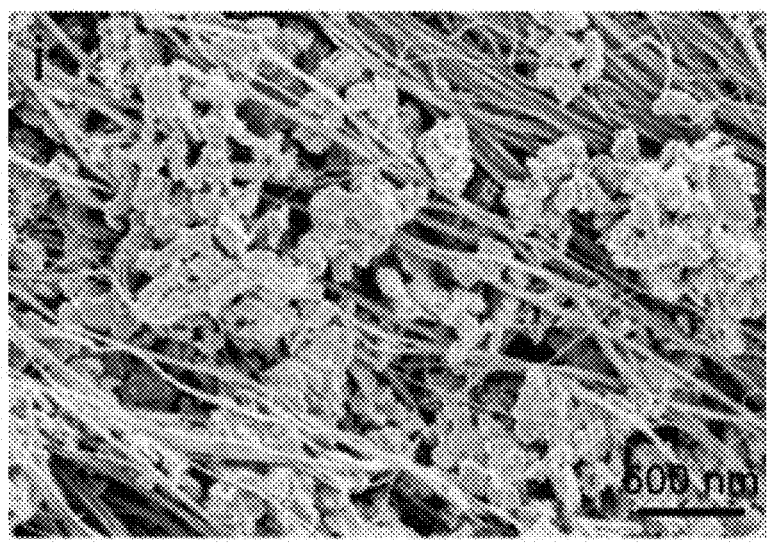

FIGS. 6F and 6G are an SEM image of aligned MWCNTs including LMO nanoparticles attached thereto, and a magnified view of the aligned MWCNTs, respectively. Referring to FIGS. 6F and 6G, LMO particles, which are active material nanoparticles used in a cathode, are attached to the aligned MWCNTs. FIGS. 6H and 6I are an SEM image of aligned MWCNTs including LTO nanoparticles attached thereto, and a magnified view of the aligned MWCNTs, respectively. Referring to FIGS. 6H and 6I, LTO particles, which are active material nanoparticles used in an anode, are attached to the aligned MWCNTs. The LMO nanoparticles and the LTO nanoparticles are evenly dispersed within MWCNT bundles in order to provide a high energy storage capability, and the aligned MWCNT may serve as a conductive scaffold capable of providing a low electric resistance.

FIGS. 7A to 7D are graphs showing photoelectric conversion and energy storage characteristics of an electric energy harvesting and storage device according to an exemplary embodiment.

Figure 7A:
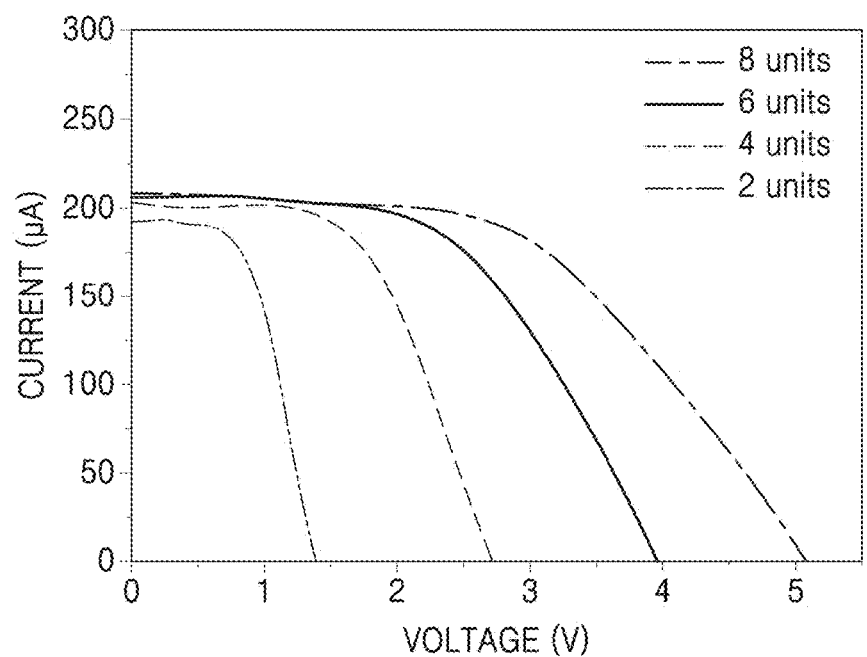
FIG. 7A is a graph showing current-voltage curves of photoelectric conversion units of an electric energy harvesting and storage device according to an exemplary embodiment with respect to an increase in the number of photoelectric conversion units.

In detail, FIG. 7A shows current-voltage curves of photoelectric conversion units with respect to an increase in the number of photoelectric conversion units. Referring to FIG. 7A, a photoelectric conversion unit has an open-circuit voltage of about 0.68 volt (V) and power conversion efficiency of about 6.05%. 8 photoelectric conversion units provide an open-circuit voltage of about 5.12 V, which is about 7.5 times that of one photoelectric conversion unit.

Figure 7B:
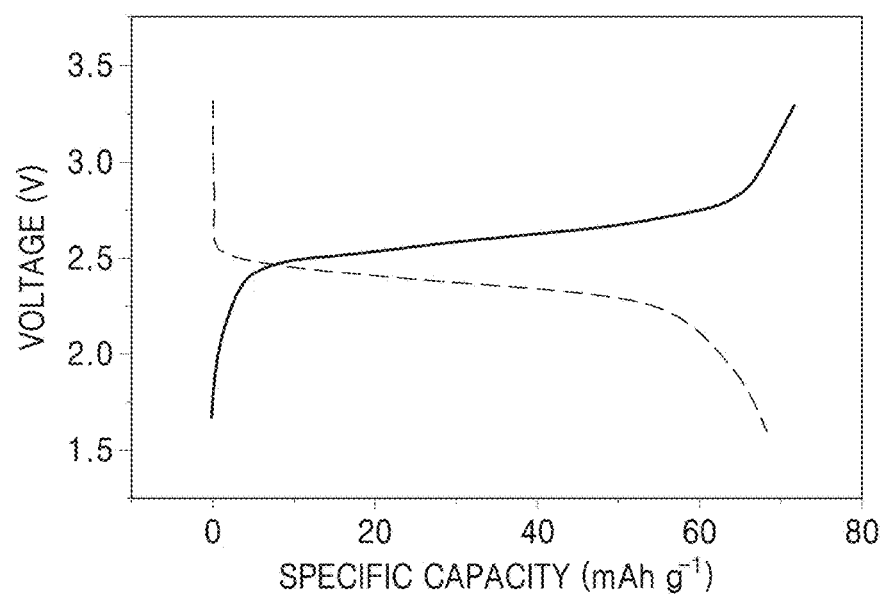
FIG. 7B is a graph showing a charging and discharging profile of a lithium ion storage unit of an electric energy harvesting and storage device according to an exemplary embodiment at a current of 0.2 milliampere (mA)

FIG. 7B is a graph showing a voltage profile during charging and discharging of a lithium ion storage unit at a current of about 0.2 milliampere (mA). Referring to FIG. 7B, the lithium ion storage unit provides high coulombic efficiency of about 95% or greater.

Figure 7C:
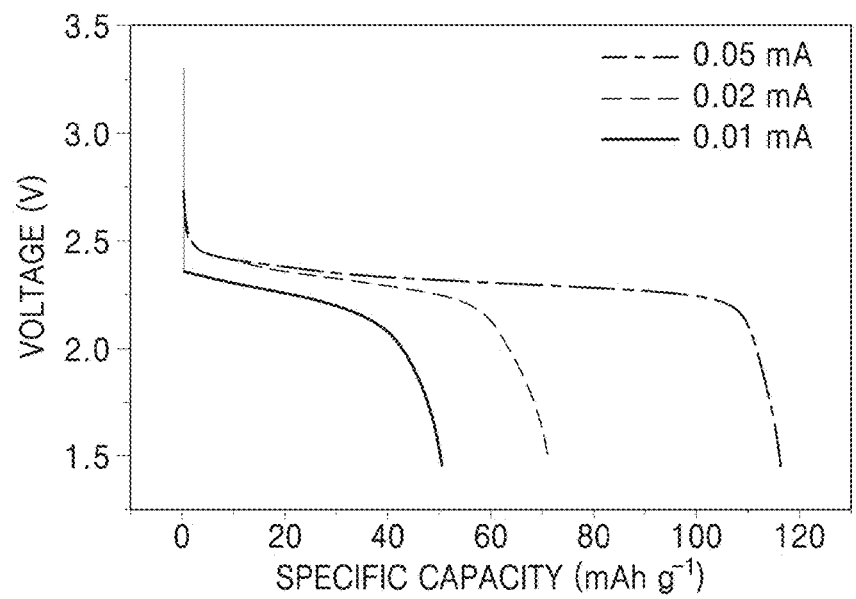
FIG. 7C is a graph showing discharge curves of a lithium ion storage unit of an electric energy harvesting and storage device according to an exemplary embodiment with respect to an increase in a current from 0.01 mA to 0.05 mA.

FIG. 7C is a graph showing discharge curves of a lithium ion storage unit with respect to a decrease in a discharge current from about 0.05 mA to about 0.01 mA. Referring to FIG. 7C, as the discharge current decreases from about 0.05 mA to about 0.01 mA, a discharging plateau voltage increased from about 2.2 V to about 2.5 V. This shows that a lithium ion storage unit stably operates with a change in a discharge current.

Figure 7D:
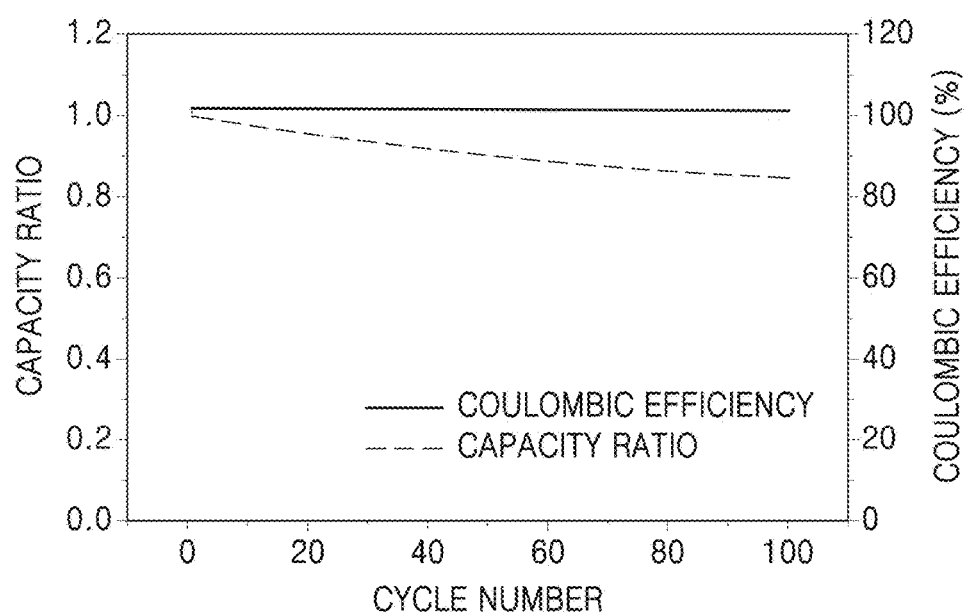
FIG. 7D is a graph showing cyclic performance of a lithium ion storage unit of an electric energy harvesting and storage device according to an exemplary embodiment during 100 charging and discharging cycles.

FIG. 7D is a graph showing cyclic performance of a lithium ion storage unit during 100 charging and discharging cycles. Referring to FIG. 7D, even when 100 charging and discharging cycles are conducted, coulombic efficiency is maintained as about 100%, and a capacity ratio is also maintained as about 0.84.

FIGS. 8A to 8D are graphs showing photocharging and discharging performance of an electric energy harvesting and storage device according to an exemplary embodiment.

Figure 8A:
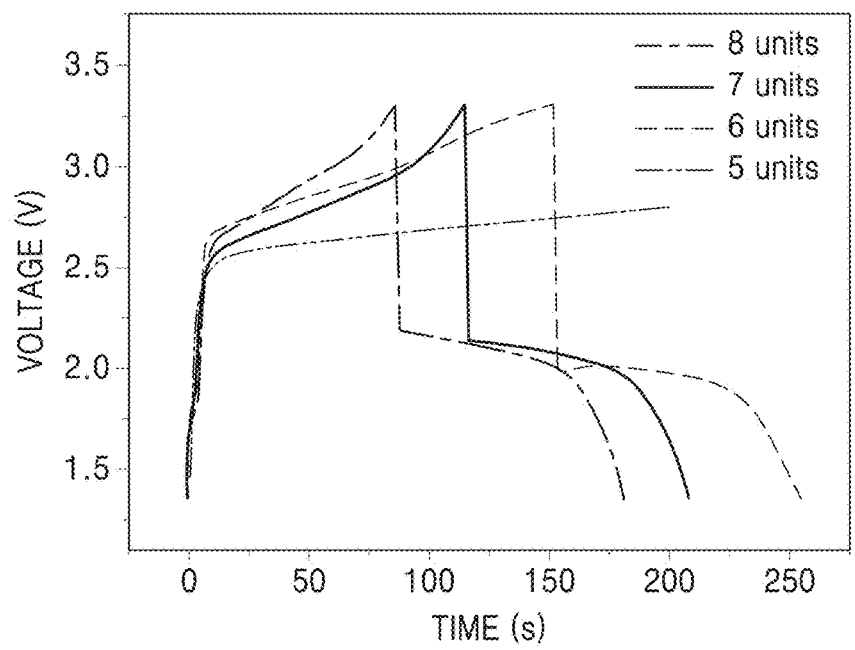
FIG. 8A is a graph showing photocharging and discharging curves of an electric energy harvesting and storage device according to an exemplary embodiment with respect to an increase in the number of photoelectric conversion units.

In detail, FIG. 8A shows photocharging and discharging curves of an electric energy harvesting and storage device according to an exemplary embodiment with respect to an increase in the number of photoelectric conversion units. A photocharging process was conducted under simulated AM1.5 solar light having a power density of 100 milliwatt per square centimeter (mW cm$^{-2}$), and a discharging process was conducted at a current of about 0.05 mA. Referring to FIG. 8A, when 5 photoelectric conversion units are used, a voltage of a lithium ion storage unit rapidly increases until about 2.5 V but very slowly increases until about 3.3 V. Even when the lithium ion storage unit was discharged at about 3 V, the voltage thereof rapidly decreases until about 1.5 V without a typical discharging plateau voltage. As shown in FIG. 8A, when 5 photoelectric conversion units are used, an undesirable photocharging process is shown due to a low photovoltage. When 6 photoelectric conversion units are used, the voltage of the lithium ion storage unit rapidly increases from about 1.5 V to about 3.3 V within 150 seconds, and thus a desirable photocharging process is shown. Moreover, when 7 photoelectric conversion units are used and 8 photoelectric conversion units are used, a photocharging time decreased to 115 seconds and 86 seconds.

Figure 8B:
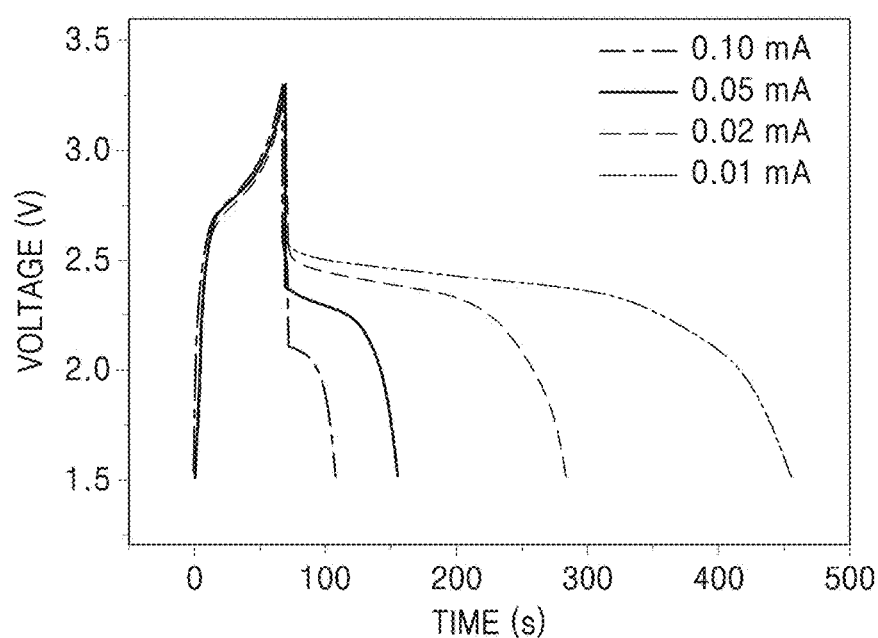
FIG. 8B is a graph showing photocharging and discharging curves of an electric energy harvesting and storage device according to an exemplary embodiment with respect to an increase in discharge currents.

FIG. 8B shows photocharging and discharging curves of an electric energy harvesting and storage device according to an exemplary embodiment with respect to an increase in discharge currents. 8 photoelectric conversion units were used. Referring to FIG. 8B, the electric energy harvesting and storage device may perform discharging at various currents ranging from about 0.01 mA to about 0.1 mA.

Figure 8C:
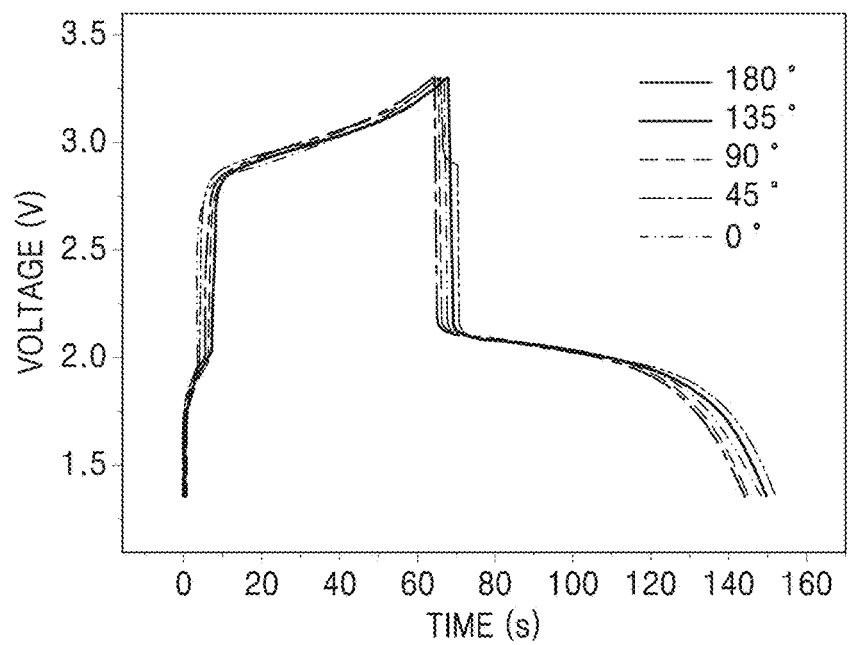
FIG. 8C is a graph showing photocharging and discharging curves of an electric energy harvesting and storage device according to an exemplary embodiment with respect to angles of incident light.

FIG. 8C shows photocharging and discharging curves of an electric energy harvesting and storage device according to an exemplary embodiment with respect to angles of incident light. Referring to FIG. 8C, since power conversion efficiency in photoelectric conversion units is irrelevant to the incidence angle of light, the photocharging and discharging curves of the electric energy harvesting and storage device rarely change even when the incidence angle of light increases from about 0° to about 180°. Thus, the electric energy harvesting and storage device may obtain electric energy from light beams incident at various angles, and is usefully applicable particularly in a room full of scattered light.

Figure 8D:
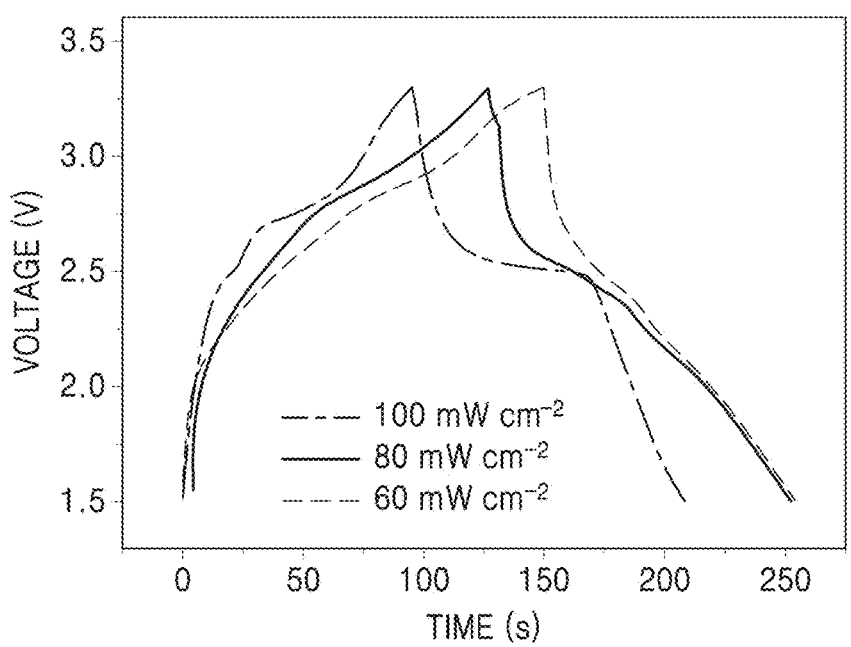
FIG. 8D is a graph showing photocharging and discharging curves of an electric energy harvesting and storage device according to an exemplary embodiment with respect to energy densities of incident light.

FIG. 8D shows photocharging and discharging curves of an electric energy harvesting and storage device according to an exemplary embodiment with respect to energy densities of incident light. Referring to FIG. 8D, as the energy density of incident light decreases from about 100 $mWcm^{-2}$ to about 60 $mWcm^{-2}$, a photocharging time of the electric energy harvesting and storage device including 8 photoelectric conversion units increased from about 95 seconds to about 150 seconds. A specific capacity of the electric energy harvesting and storage device was maintained with a low variability of about 10%. A performance dependency on the energy density of incident light may be desired in many fields, for example, in the field of wearable devices under weak light.

As described above, a lithium ion storage unit and a plurality of serially-connected photoelectric conversion units are integrated onto a fiber-shaped substrate in a core-sheath structure, thereby manufacturing an electric energy harvesting and storage device capable of achieving high photoelectric conversion efficiency and high energy storage capability. The electric energy harvesting and storage device is embodied in flexible fibers and is thus usefully applicable to next-generation electronic apparatuses such as wearable devices. It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An electric energy harvesting and storage device comprising:
   a substrate having a fiber shape;
   a lithium ion storage unit disposed to surround the substrate; and
   a plurality of photoelectric conversion units disposed to surround the lithium ion storage unit.

2. The electric energy harvesting and storage device of claim 1, wherein the photoelectric conversion units are spaced apart from one another in a length direction of the substrate and are serially connected to one another.

3. The electric energy harvesting and storage device of claim 1, wherein the lithium ion storage unit comprises:
   a cathode having a fiber shape and disposed around the substrate;
   an anode having a fiber shape and disposed around the substrate;
   a first cylindrical tube disposed to be spaced apart from the substrate and surround the substrate; and
   a first electrolyte disposed to fill a space between the substrate and the first cylindrical tube.

4. The electric energy harvesting and storage device of claim 3, wherein the cathode and the anode wind the substrate.

5. The electric energy harvesting and storage device of claim 3, wherein each of the cathode and the anode comprises:
   aligned multi-wall carbon nanotubes; and
   active material nanoparticles attached to the multi-wall carbon nanotubes.

6. The electric energy harvesting and storage device of claim 3, wherein each of the photoelectric conversion units comprises:
   a counter electrode disposed on the first cylindrical tube;
   a photoanode disposed on the counter electrode;
   a second cylindrical tube disposed to be spaced apart from the first cylindrical tube and surround the first cylindrical tube; and
   a second electrolyte disposed to fill a space between the first cylindrical tube and the second cylindrical tube.

7. The electric energy harvesting and storage device of claim 6, wherein the counter electrode comprises aligned multi-wall carbon nanotubes disposed to surround the first cylindrical tube.

8. The electric energy harvesting and storage device of claim 6, wherein the photoanode winds the counter electrode in a spiral shape.

9. The electric energy harvesting and storage device of claim 8, wherein the photoanode comprises:
   titanium wire disposed on the counter electrode; and
   titanium dioxide nanotubes vertically aligned on a surface of the titanium wire.

10. The electric energy harvesting and storage device of claim 6, wherein the photoanode of a photoelectric conversion unit of the photoelectric conversion units is electrically connected to the counter electrode of an adjacent photoelectric conversion unit thereof.

11. The electric energy harvesting and storage device of claim 10, wherein
   the photoanode of the photoelectric conversion unit is electrically connected to the anode of the lithium ion storage unit, and
   the counter electrode of the photoelectric conversion unit is electrically connected to the cathode of the lithium ion storage unit.

12. A method of manufacturing an electric energy harvesting and storage device, the method comprising:
   preparing a substrate having a fiber shape;
   providing a lithium ion storage unit to surround the substrate; and
   providing a plurality of photoelectric conversion units to surround the lithium ion storage unit.

13. The method of claim 12, wherein the photoelectric conversion units are spaced apart from one another in a length direction of the substrate and are serially connected to one another.

14. The method of claim 12, wherein the providing the lithium ion storage unit comprises:
   providing a cathode having a fiber shape and an anode having a fiber shape on the substrate;
   providing a first cylindrical tube to be spaced apart from the substrate and to surround the substrate; and providing a first electrolyte between the substrate and the first cylindrical tube.

15. The method of claim 14, wherein each of the cathode and the anode comprises:
   aligned multi-wall carbon nanotubes; and
   active material nanoparticles attached to the aligned multi-wall carbon nanotubes.

16. The method of claim 14, wherein the providing the photoelectric conversion units comprises:
   providing a counter electrode on the first cylindrical tube;
   providing a photoanode on the counter electrode;
   providing a second cylindrical tube to be spaced apart from the first cylindrical tube and to surround the first cylindrical tube; and
   providing a second electrolyte between the first cylindrical tube and the second cylindrical tube.

17. The method of claim 16, wherein the photoanode winds the counter electrode in a spiral shape.

18. The method of claim 16, wherein the photoanode of each of the photoelectric conversion units is electrically connected to the counter electrode of an adjacent photoelectric conversion unit thereof.

* * * * *